Figure 1:
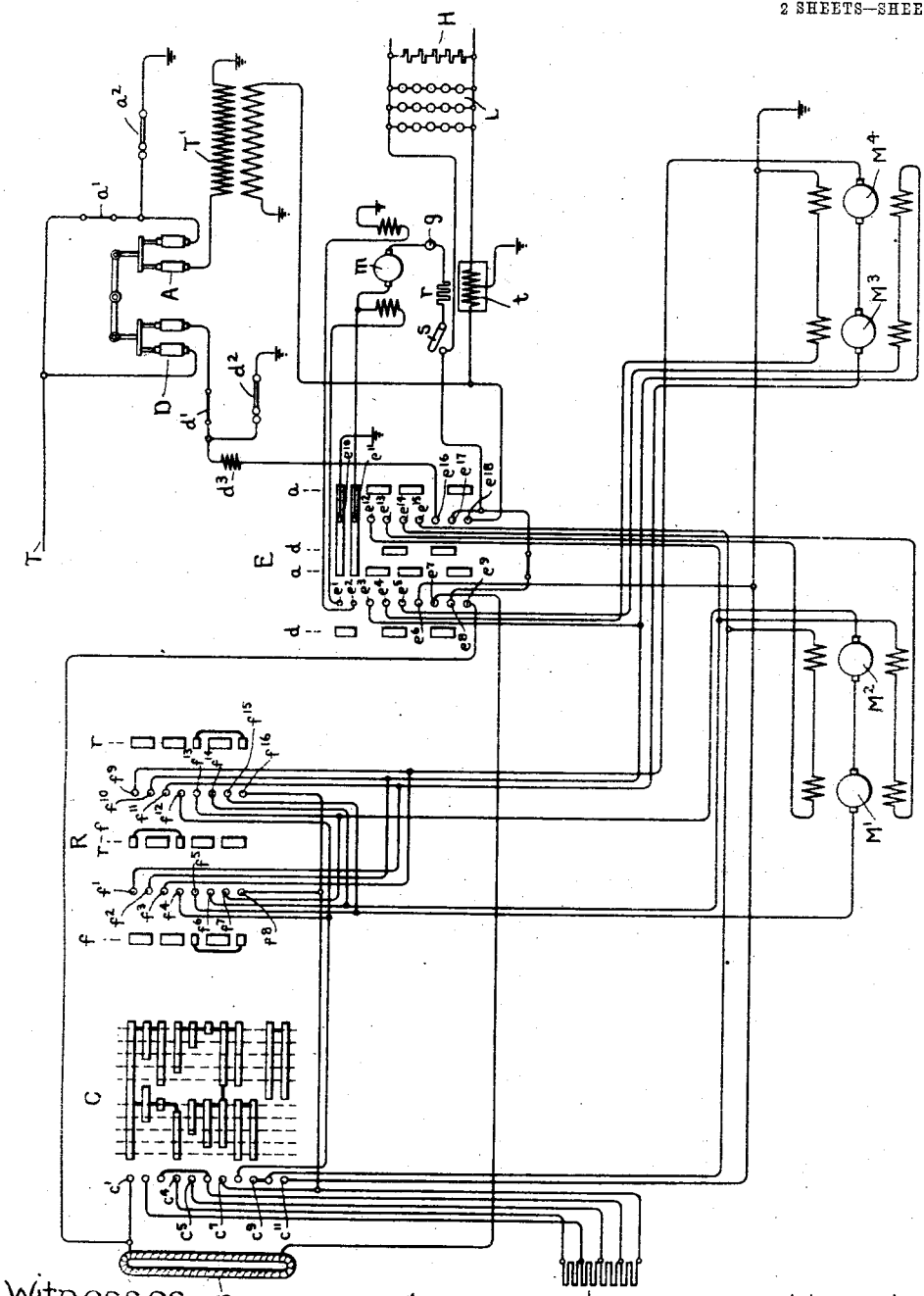

No. 832,745. PATENTED OCT. 9, 1906.
J. S. PEVEAR.
MOTOR CONTROL.
APPLICATION FILED AUG. 10, 1904.

2 SHEETS—SHEET 2.

Witnesses
Inventor:
Jesse S. Pevear.
by Albert H. Davis
Atty.

UNITED STATES PATENT OFFICE.

JESSE S. PEVEAR, OF SCHENECTADY, NEW YORK, ASSIGNOR TO GENERAL ELECTRIC COMPANY, A CORPORATION OF NEW YORK.

MOTOR CONTROL.

No. 832,745.  Specification of Letters Patent.  Patented Oct. 9, 1906.

Application filed August 10, 1904. Serial No. 220,166.

*To all whom it may concern:*

Be it known that I, JESSE S. PEVEAR, a citizen of the United States, residing at Schenectady, in the county of Schenectady and State of New York, have invented certain new and useful Improvements in Motor Control, of which the following is a specification.

My invention relates to the control of electrically-propelled vehicles driven by motors adapted for operation on both direct and alternating currents.

It is sometimes desirable to employ a high-tension alternating current over a portion of the length of an electrical railway—as, for instance, in the country or over private rights of way—and to employ low-tension direct current over other portions, as in city streets. Certain types of motors—as, for instance, the well-known series motor—may be designed for operation on either alternating or direct current. When a transformer is employed for reducing the alternating-current voltage to the proper amount for impressing upon the motor-terminals, switches are required on the car for connecting the trolley to the primary of the transformer or directly to the motors with the transformer cut out of circuit, according as the operation is on alternating or direct current. Furthermore, it is important that both of these switches shall not be closed at the same time, since damage would result either to the transformer or to the motor.

The above-mentioned change in the circuits is not all that is required, since if a series motor is designed for operation upon a certain alternating-current voltage and is then connected to a direct-current source of the same voltage the motor will be heavily overloaded, since the motor then possesses no self-induction, and the entire impressed voltage must be balanced by the counter electromotive force developed in the motor-armature—that is, both the current-flow and the speed will increase. When the direct-current voltage is not equal to the alternating-current voltage, but is greater—as, for instance, when two hundred volts alternating and three hundred volts direct are employed per motor—the overload would be still more serious. Consequently in changing from alternating to direct currents the motor-field should be strengthened, so as to increase the counter electromotive force per ampere. This can be accomplished in a simple manner by connecting the two portions of the field in parallel for alternating current and in series for direct current.

The above system, in its broadest aspects, is fully set forth in Patent No. 783,124, granted February 21, 1905, on application filed by Maurice Milch, and in Patent No. 808,778, granted on January 2, 1906, on an application filed by William B. Potter, a development is disclosed.

In some of its aspects the present invention relates to improvements in said system, one of the features of the present invention residing in a novel arrangement of the switches for connecting either the transformer or the motors to the trolley, whereby it is impossible that both should be closed at the same time.

Another feature of my invention consists in so arranging the switch for making the change in the motor-fields and also the two switches mentioned above for connecting the trolley to transformer or to motors direct that the switches are interlocked with each other and that the switch for varying the motor-field cannot be moved except when both of the other switches are in their off position.

Other features of my invention will appear from the following specification and accompanying drawings, in which—

Figure 2:
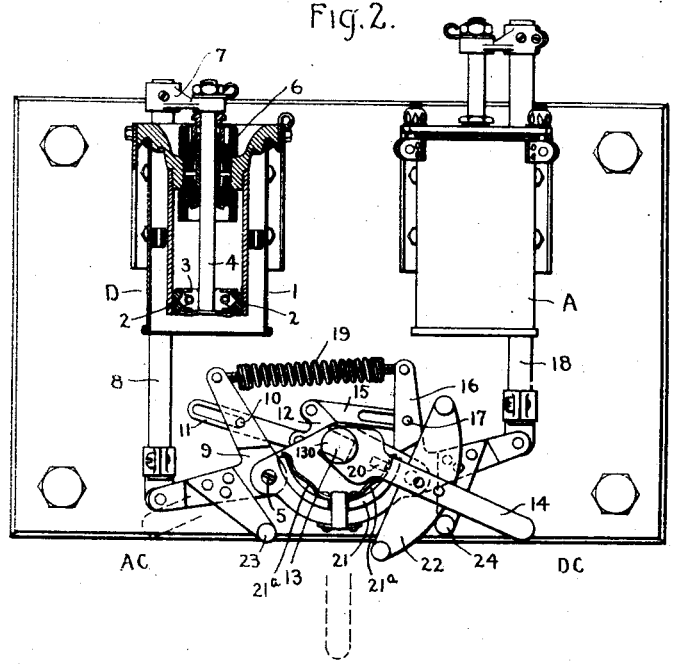
Figure 3:
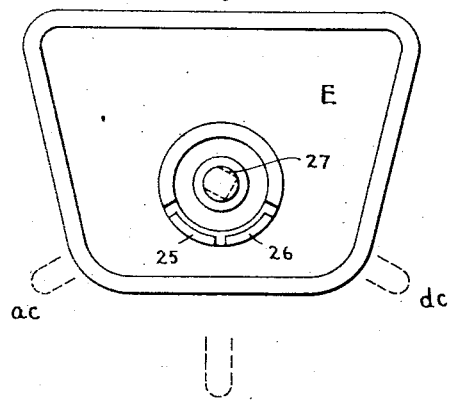

Figure 1 shows diagrammatically a control system embodying my invention. Fig. 2 shows the construction of the switches for connecting the trolley to the transformer or motors direct, and Fig. 3 shows the top of a casing for a switch which varies the field strength of the motors.

Referring first to Fig. 1, $M'$ $M^2$ $M^3$ $M^4$ represent four driving-motors for a vehicle connected in two groups of two motors connected in series. C represents the usual controlling-switch for the motors, arranged to connect the two groups of motors in series and in parallel and to vary the amount of the resistance I in the motor-circuit. B represents the usual blow-out coil for the controller. R represents the reversing-switch by means of which the relative connections of fields and armatures may be reversed to reverse the direction of rotation of the motors. The field of each motor is shown divided into two parts which are connected to the switch E, which I shall hereinafter call the "com mutating-switch" and which acts to connect the two portions of the field in series and in parallel. The motors and the controlling-switch C are connected, through the commutating-switch E, to the secondary of the transformer T' or to the switch D, according as to which position the commutating-switch E is in. The primary of transformer T' is connected to switch A. T represents the trolley or other source of current, which is connected both to switch D and to switch A. Thus if switch D is closed trolley T is connected directly through the commutating-switch D to the motor-circuits, while if switch A is closed the trolley T is connected, through the primary of transformer T', to earth. The two switches A and D are shown mounted on a single operating-lever indicating diagrammatically that when one switch is opened the other is closed. $m$ represents an auxiliary motor for driving an air-compressor and is connected to contacts on the commutating-switch E. $r$ indicates a resistance in series with the motor $m$. $g$ represents a governor for the motor $m$, and $s$ represents a switch by which the circuit of motor $m$ may be opened or closed. L represents lamps, and H heating-coils, one circuit-terminal of which is connected to the commutating-switch E and the other terminal to a terminal of the compensator $t$. The other terminal of compensator $t$ is connected to a contact of commutating-switch E, while an intermediate tap is connected to earth.

The operation is as follows: Assume that switch D is closed, thereby opening switch A and connecting trolley T to contact $e^{16}$ of commutating-switch E; assume that commutating-switch E is in the position to bring the movable contacts on the lines $d$ $d$ in engagement with the stationary contact-fingers; assume that reversing-switch R is in forward position—that is, with the movable contacts on the line $f$ and $rf$ in engagement with the stationary contact-fingers, then let the controlling-switch C be moved to its first position, as indicated by the first dotted line. The circuits are then as follows: trolley T, switch D, contact $e^{16}$, contact $e^{17}$, contact $e^8$, contact $e^7$, blow-out coil B, contact $c'$, contact $c^4$, resistance I, contacts $f^8$ and $f^{16}$, contacts $f^5$ and $f^{15}$, armature of motor M', armature of motor M², contacts $f^{13}$ and $f^7$, contacts $f^6$ and $f^{14}$, through the lower halves of the fields of motors M² and M', contact $e^{14}$, contact $e^{13}$, through the upper halves of fields of motors M' M², contact $c^9$, contact $c^8$, contacts $f^4$ and $f^{12}$, contacts $f^3$ and $f^9$, through armatures of motors M⁴ and M³, contacts $f^{11}$ and $f'$, contacts $f^{10}$ and $f^2$, through the lower halves of fields of motors M⁴ and M³, contact $e^5$, contact $e^4$, upper halves of fields of motors M³ and M⁴ to ground. The motors are thus connected all in series with each other, with the two portions of the field of each motor in series. Further circuits may readily be traced through the lamps and heaters and through the air-compressor motor; but since these form no part of the present invention they will not be described in detail. As controlling-switch C is moved through its other positions resistance I is cut out of circuit step by step, then the motors are connected in parallel with the resistance I, reinserted, and the resistance is then again cut out of circuit, this being the usual arrangement of series-parallel controlling-switches. These changes in circuits need not be traced here in detail, but will be evident from an inspection of the drawings. Now if switch D is open and commutating-switch E is moved to bring the movable contacts on the line $a$ $a$ into engagement with the stationary contact members and if the switch A is then closed the following circuit will be established: The trolley T is connected directly to the primary of transformer T'. Starting from the right-hand terminal of the secondary winding of transformer T' the motor-circuit runs as follows: contact $e^{18}$, contact $e^{17}$, contact $e^8$, contact $e^9$, contact $c'$, contact $c^4$, resistance I, contacts $f^8$ and $f^{16}$, contacts $f^5$ and $f^{15}$, through armature of motor M', armature of motor M², contacts $f^{13}$ and $f^7$, contacts $f^{14}$ and $f^6$. Here the current divides, part going through the lower halves of the field of the motors M² and M' and through contacts $e^{14}$ and $e^{15}$ and the other part going through contacts $e^{12}$ and $e^{13}$ and through the upper halves of the field of motors M' and M². The current then unites, passing through contact $c^9$, contact $c^8$, contacts $f^4$ and $f^{12}$, contacts $f^3$ and $f^9$, armature of motor M⁴, armature of motor M³, contacts $f^{11}$ and $f'$, contacts $f^{10}$ and $f^2$. Here the current divides, part passing through contact $e^3$ and contact $e^4$ and the upper halves of the fields of motors M³ and M⁴ to ground and the other half passing through the lower halves of fields of motors M⁴ and M³, contact $e^5$, contact $e^6$ to ground. The motors are thus connected in series with each other with all the resistance in circuit; but the parts of each field are in parallel with each other. Thus the motors are properly connected for operating on alternating current. The lamp and heater and compressor motor-circuits may also be readily traced, these circuits also passing through the commutator-switch.

The utility and peculiar advantages of the present invention, which will now be described, will now be more apparent in view of the requirements of the system just set forth. Referring to Fig. 2, the operating mechanism and the means for preventing a simultaneous closing of the switches D and A will be described and explained. Since the two switches are alike, a description of one will suffice for both. The switch D is shown in cross-section. 1 represents a pot adapted to contain oil, in which are suspended the stationary terminals 2 2. 3 represents a movable contact adapted when in the position shown to engage the stationary contacts. The movable contact 3 is carried by a rod 4, which is vertically movable through an insulated bushing 6. When the rod 4 is lowered, the switch is closed, and when it is raised the switch is opened. The rod 4 is connected by an arm 7 to a vertically-movable rod 8, the lower end of which is secured to one arm of the bell-crank lever 9. This bell-crank lever, which is pivoted at 5, carries on its other arm a pin 10, engaging a slot in the pivoted link 11. The pivoted link 11 is carried by the member 12, which is secured to the shaft 13. At a point near its other end the shaft 13 is flattened or formed square for a portion of its length, as indicated in dotted lines, so as to form a head 130, which engages with the outer face of the operating-handle 14, which fits upon the flattened or squared portion of the shaft. By means of the operating-handle the shaft 13 and the member 12 may be rotated so as to move the pivoted links 11 and 15. The link 15 engages a pin 17 on the bell-crank lever 16, the other end of which engages the operating-rod 18 of the switch A. The two bell-cranks 9 and 16 are connected by a tension-spring 19, which tends to pull the two ends of the bell-cranks together. The bell-crank 16 in the position illustrated abuts against a stop, (not shown,) while the bell-crank 9 is held in the position shown by the link 11 engaging the pin 10.

The operation is as follows: If handle 14 is moved from the position shown to its central position, as indicated by dotted lines, the member 12 will be rotated, moving link 11 toward the right and allowing the bell-crank 9 to be rocked by spring 19, raising rod 8 and opening switch D. Bell-crank 16 will not be moved during this operation on account of the lost-motion connection between it and the pivoted link 15 and will be held in the position shown by the spring 19. If the motion of handle 14 is continued to its other extreme position, bell-crank 9 will be left in the position against its stop and link 15 will push bell-crank 16 so as to lower rod 18 and close switch A. The member 12 and the links 11 and 15 act as toggle-joints to give a strong closing pressure and to lock the switch in position against the spring tension. Both switches are normally open. Only one switch at a time can be closed by a movement of the handle in one direction or the other from its central position. It will be seen that it is the spring 19 which returns each switch to its open position when handle 14 is moved to its off position. In order to guard against both switches being closed at once, because of the breaking of spring 19 when one switch is closed and the handle is moved to close the other, I provide the member 22, carried by the handle 14, and the two pins 23 and 24, carried on arms or extensions of bell-cranks 9 and 16, respectively. When bell-crank 9 is in the position shown, with the switch D closed, pin 23 lies in the path of member 22. When handle 14 is moved to its other position, just after it passes its off position, the member 22 will engage the post 23 and will rock the bell-crank lever 9 so as to open the switch D. Since the post 23 and the end of member 22 are rotating around different centers, the post 23 will move out of the path of member 22 after switch D is opened. Thus, the post 24 is clear of the member 22 when the bell-crank lever 16 is in the position shown. The handle 14 carries a stop 20, (shown in dotted lines,) which presses against springs 21$^a$, carried by the flange 21. This flange serves to prevent the withdrawal of the handle 14 from the shaft 13 in any position except the off position, and the springs hold the handle yieldingly in its running positions. At the off position the flange is cut away, as shown, and the handle may be withdrawn. Consequently both switches must be open in order to remove the handle. The commutating-switch E, the top of which is shown in Fig. 3, is provided with no handle of its own; but its shaft 27 is shaped to be engaged by the handle 14 of the switches D and A. Consequently in order to move the commutating-switch D from one position to the other it is necessary to bring handle 14 to its off position, opening switches D and A, in order that the handle may be withdrawn and applied to the commutating-switch E. The commutating-switch E is provided with flanges 25 and 26, which allow the insertion and withdrawal of the handle only at off position and its two opposite positions. This insures that the switch will be left in the proper position when the handle is removed.

While the present invention is particularly well adapted for use as part of a system of control of the character described, it is of course not limited to that particular use, but may be employed in other situations. Furthermore, the details of the interlocking mechanism may be varied without departing from the scope of the present invention. Accordingly I do not desire to limit myself to the particular construction and arrangement of parts shown; but I aim in the appended claims to cover all such modifications as are within the scope of my invention.

What I claim as new, and desire to secure by Letters Patent of the United States, is—

1. In combination, a plurality of motors adapted for operation on either alternating or direct current, a switch adapted to connect said motors for direct-current operation, a second switch adapted to connect said motors for alternating-current operation, a single handle for said switches, and operative connections between said handle and said switches whereby one of said switches only is moved by the movement of said handle in either direction.

2. In combination, two normally open switches, a handle, operative connections between said handle and said switches whereby the movement of said handle in either direction moves one of said switches to closed position, and means carried by said handle for positively engaging said switch if said switch does not open when said handle is moved in the opposite direction to close the other switch.

3. In combination, two switches, a spring normally holding said switches open, a handle, operative connections between said handle and said switches whereby the movement of said handle in either direction moves one of said switches to closed position against the tension of said spring, and means carried by the handle for positively engaging and opening said switch if said switch is not returned to off position by said spring when said handle is moved in the opposite direction to close the other switch.

4. In combination, two normally open switches, a handle, operative connections between said handle and said switches whereby the movement of said handle in either direction moves one of said switches to closed position, and a member carried by one of said switches and arranged to be moved into the path of said handle when said switch is moved to its closed position.

5. In combination, two switches, means normally holding said switches open, a handle, operative connections between said handle and said switches whereby the movement of said handle in either direction moves one of said switches to closed position against the tension of said holding means, and a member carried by one of said switches and arranged to be moved into the path of said handle when said switch is moved to its closed position.

6. In combination, a plurality of motors adapted for operation on either alternating or direct current, a switch adapted to connect said motors for operation on alternating current, a second switch adapted to connect said motors for operation on direct current, a handle, operative connections between said handle and said switches whereby the movement of said handle in either direction closes one of said switches, means for preventing the withdrawal of said handle except when both of said switches are in off position, and a third switch in the motor-circuit arranged to be operated by said handle independently of the other switches.

7. In combination, a plurality of motors adapted for operation on either alternating or direct current, two switches adapted to connect said motors for operation on alternating and direct current respectively, a single operating-handle therefor, means for preventing the withdrawal of said handle except when said switches are both open, and a switch adapted to vary the field strength of said motors and arranged to be operated by said handle independently of the other switches.

8. In combination, a plurality of motors adapted for operation on either alternating or direct current, two switches adapted to connect said motors for operation on alternating and direct current respectively, a single operating-handle therefor, means for preventing the withdrawal of said handle except when said switches are both open, and a switch adapted to connect portions of the motor-field in series and in parallel and arranged to be operated by said handle independently of the other switches.

9. In combination, a source of current-supply, a translating device, two independent groups of switches, the actuating of one member of each of which serves to bring the source of current-supply into operative relation with the translating device, a single operating-handle adapted to be applied to all of said switches, and means for preventing the withdrawal of said handle from one of the switches when it is in a position other than its "off" position.

10. In combination, a source of current-supply, a translating device, a group of two switches and a third independent switch, the actuating of the third switch and one of the others serving to bring the source of current-supply into operative relation with the translating device, and means for preventing the operation of the third switch except when the other two are in their "off" position.

11. In combination, a source of current-supply, a translating device, a group of two switches and a third independent switch, the actuating of the third switch and one of the others serving to bring the source of current-supply into operative relation to the translating device, a common handle for operating said switches, and means for preventing the application of the handle to the third switch when one of the other switches is in a position other than its "off" position.

In witness whereof I have hereunto set my hand this 4th day of August, 1904.

JESSE S. PEVEAR.

Witnesses:
BENJAMIN B. HULL,
HELEN ORFORD.